Dec. 11, 1928.

H. B. TAYLOR 1,694,454

HYDRAULIC TURBINE

Original filed July 24, 1917

INVENTOR
H. Birchard Taylor
BY
Edwards, Sager & Bower
ATTORNEYS

Patented Dec. 11, 1928.

1,694,454

UNITED STATES PATENT OFFICE.

HARVEY BIRCHARD TAYLOR, OF PHILADELPHIA, PENNSYLVANIA.

HYDRAULIC TURBINE.

Original application filed July 24, 1917, Serial No. 182,498. Divided and this application filed September 21, 1923. Serial No. 663,952.

The principal object of my invention is to provide a new and improved substructure for a hydraulic turbine of the inflow type. A further object is to provide an improved conduit for receiving a whirling discharge from the runner and directing it downwardly and outwardly along a curved flaring path of constantly increasing radius. Another object of my invention is to provide suitable supporting means for such a turbine and its associated masonry structure. Another object is to make a stay vane ring to go in the draft conduit of such a turbine. Still another object of my invention is to provide columns or piers in the draft conduit beneath such a turbine that shall be effective as supports for the superposed structure and at the same time have the proper disposition as vanes with respect to the water flow in the conduit. These and other objects of my invention will be made apparent in the following disclosure of a limited number of examples of forms in which the invention may be embodied. Following is a description which refers specifically to these respective modifications; it will be apparent that other modifications may be made that will embody the same inventive idea.

Figure 1:
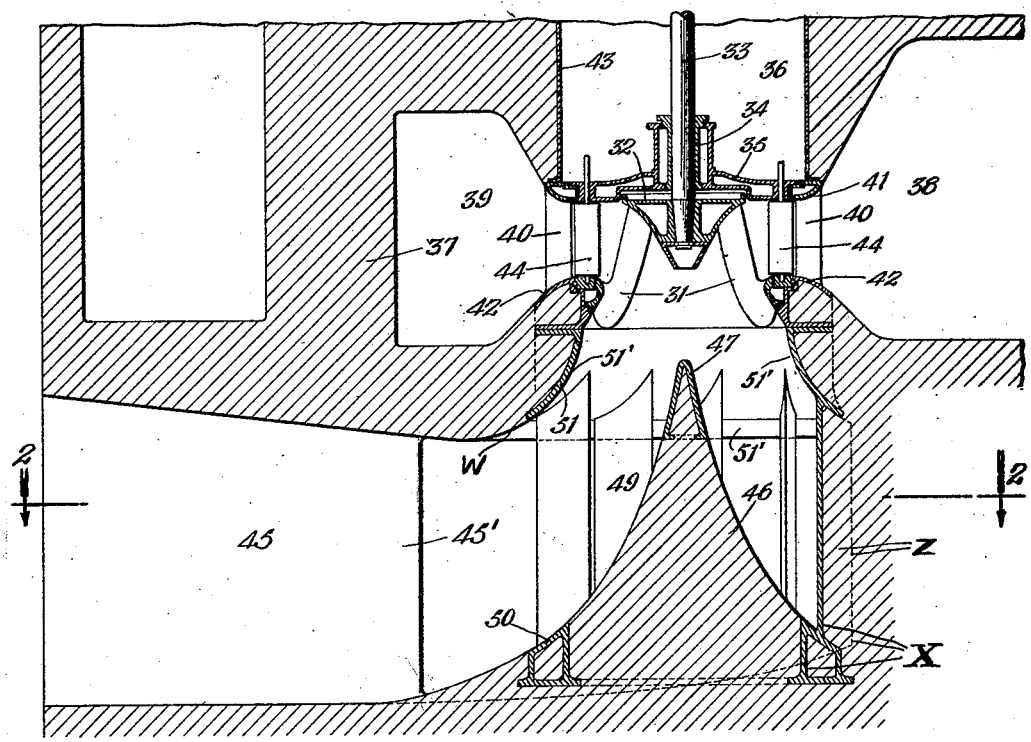
Figure 2:
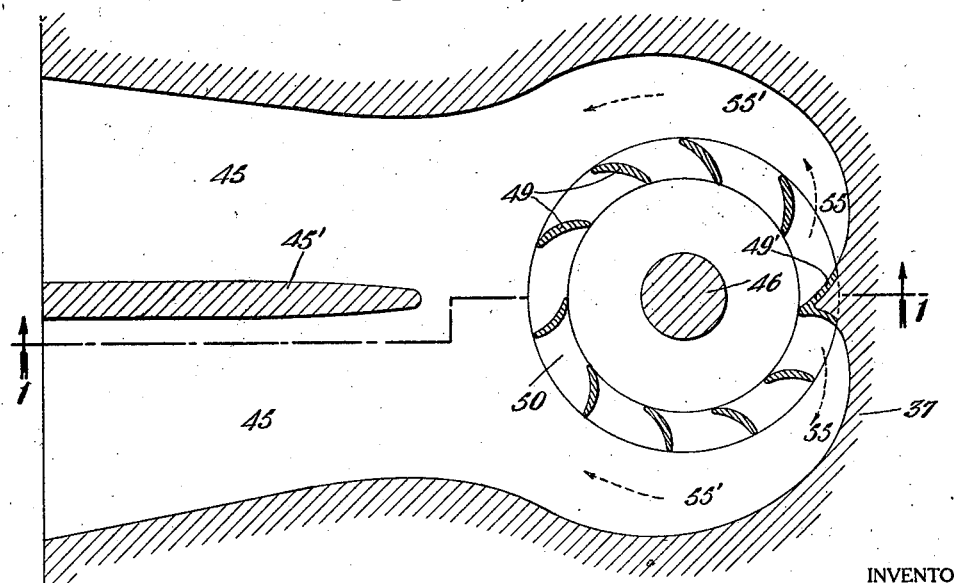

Fig. 1 is a vertical axial section taken on the line 1—1 of Fig. 2 showing one embodiment of my invention, and Fig. 2 is a horizontal section taken on the line 2—2 of Fig. 1.

The turbine runner 32, shown in Figs. 1 and 2, has the vanes 31 and is carried by the shaft 33 mounted in the lower bearing 34 which is supported by the head cover 35 in the lower end of the pit 36. This pit 36 is formed in the concrete structure 37, and also formed therein is the conduit 38 for the water that is supplied to the turbine runner. This conduit 38 has piers which support the upper wall from the lower wall and are shaped efficiently to direct and distribute the flow of water as it approaches the guide vanes and runner. The supply conduit 38 terminates in a spiral or volute portion 39 surrounding the runner 32. A speed ring is provided, which consists of the metal speed ring vanes 40 cast integrally with the top and bottom rings 41 and 42. Thus the entire speed ring may be one casting or it may be cast in segments with one or more vanes 40 and the proximate portions of the upper and lower rings 41 and 42 in each casting.

The pit 36 has a metal lining 43 which is supported on the upper ring 41 of the speed ring. The periphery of the head cover 35 also rests on the crown 41 of the speed ring. The adjustable guide vanes 44 are pivotally mounted in the head cover 35 around the runner 32. Within the adjustable guide vanes 44 is the runner space in which the flow passes to and through the runner 41 and down to the outflow conduit 45. This runner space extends downward below the guide vanes 44 and its lower portion is bounded by the inner exposed surface of the lower ring casting 42 of the speed vane ring formed by the upper and lower rings 41 and 42 and stay vanes 40. This speed vane ring 42 is supported from below by the crown ring 51 of the lower stay vanes 49.

Below the runner 32 formed in the concrete structure 37 is the outflow conduit 45 for the water discharged from the runner 32. The upper wall or roof surface of this outflow conduit 45 is a smooth continuation of the flaring wall 51 and is supported by a pier 45′ which is so disposed as most efficiently to direct and distribute the flow of water therethrough. The axial flow or entrance portion of the outflow conduit 45 directly beneath the runner 32 receives the flow between the outer flaring wall 51 and the central conical core 46 forming between them an annular passage which spreads and turns and decelerates the flow and delivers it to opposite spiral chambers 55, each of which receives the water from approximately 180° of the whole angular space around the axis of the runner. It will be seen that the two streams in the two chambers 55 are directed oppositely, as indicated by the dotted lines 55′, but they unite in one stream in the conduit 45. There is one special pier at the beginning of the spiral conduit and this is designated 49′, but it is to be noticed that the remaining piers or vanes 49 are not of the same shape because part of them must be adapted for a right-hand direction and the others for a left-hand direction. This difference in shape is apparent in Fig. 2. The upstream end Z of the discharge chambers 55 is tangent to the stream descending through the inlet portion of the draft tube and this upstream end is wedge-shaped as shown at 49', the apex or front line of the wedge being axial in direction and substantially tangent to the outer flaring wall 51'.

The flow passing downward in an axial direction from the runner enters the annular passage around the central core 46 and is turned outward between this core and the outer flaring wall 51'. From this annular passage which is symmetrical around a vertical axis the flow passes outward and is collected in the two opposite spiral chambers 55 which together with the discharge conduit 45 form the radially directed discharge portion of the draft conduit. The draft conduit is thus as a whole of generally elbow shape with an inner gradually curved bend W along the flaring surface 51' which turns and merges with the top surface of the discharge portion of the conduit 45. The outward flaring shape of the outer wall 51' of the axial or entrance portion of the draft conduit spreads the flow outward on all sides into the spiral collecting chambers 55 so that the shape of the draft conduit at the elbow portion is relatively wide and flat and acts both to collect the flow and to turn it down stream toward the discharge outlet 45 of the conduit.

Considering the elbow formed by the draft conduit as a whole the inner bend W is a gradually curving surface of relatively large radius of curvature while the outer bend X is formed between surfaces meeting in relatively sharp angles so that this outer portion does not have the gradual curvature of the inner portion of the elbow. At this outer portion of the elbow the flaring surface of the entrance portion of the draft conduit is extended substantially axially as indicated at Z to form the end surface of the discharge chambers 55. This application is a division of my Patent No. 1,490,297 issued April 15, 1924.

I claim:

1. In combination, a turbine runner, a structure on the discharge side of said runner having an outflow conduit with walls formed as surfaces of revolution around the runner axis and leading the discharge outward away from said axis and stay vanes between said walls arranged in a series around said axis, said vanes being inclined to radii of said axis and vanes on one side of the conduit having a different sectional curvature from vanes on the other side of the conduit.

2. In combination, a turbine runner, a structure on the discharge side of said runner having an outflow conduit with walls formed as surfaces of revolution around the runner axis and leading the discharge outward away from said axis and stay vanes between said walls arranged in a series around said axis, said vanes being inclined to radii of said axis and vanes on one side of the conduit having a different sectional curvature from vanes on the other side of the conduit and passages receiving the flow from said vanes and guiding said flow toward tail water.

3. In combination, a turbine runner, a structure on the discharge side of said runner having an outflow conduit with walls formed as surfaces of revolution around the runner axis and leading the discharge outward away from said axis and stay vanes between said walls arranged in a series around said axis, said vanes being inclined to radii of said axis and vanes on one side of the conduit having a different sectional curvature from vanes on the other side of the conduit and a plurality of volute passages receiving the flow from said vanes and guiding said flow toward tail water.

4. In combination, a turbine runner, a masonry structure around the turbine axis and having an outflow conduit formed therein and a series of metal stay vanes in said conduit arranged in a series which surrounds the runner axis and stays opposite walls of the conduit rigidly together, each such stay vane having small thickness transverse to the direction of flow and being set at a suitable angle to a plane through the vane and containing the turbine axis, so as to offer small resistance to the outflowing water and vanes at one side of the conduit having a different sectional shape from vanes on the other side of said conduit.

5. In combination, a turbine runner with vertical axis, a masonry foundation structure around the runner axis having an outflow conduit formed therein and a circular series of metal stay vanes in said conduit surrounding said vertical axis and supporting the upper wall of said conduit on the lower wall thereof, said vanes shaped in conformity with expanding spiral paths of flow of the water and vanes on one side of the conduit having a different sectional shape from vanes on the other side of said conduit.

6. In a hydraulic turbine the combination with a runner having a substantially axial discharge, of a draft tube therefor comprising an outer wall formed as a surface of revolution flaring outwardly away from the axis, a central conical core member having its surface similarly flared, said core and walls forming between them an annular passage radially flaring from a central axis in lines adapted to maintain the flow in annular hollow column formation while changing its direction and decelerating its velocity, and a chamber surrounding the outlet of said annular passage and comprising two collection chambers with eccentric side walls turning the flow toward tail water.

7. In a hydraulic turbin the combination with a runner having a substantially axial discharge, of a draft tube therefor comprising an outer wall formed as a surface of revolution flaring outwardly away from the axis, a central conical core member having its surface similarly flared, said core and walls forming between them an annular passage radially flaring from a central axis in lines adapted to maintain the flow in annular hollow column formation while changing its direction and decelerating its velocity, and a chamber surrounding the outlet of said annular passage and comprising two collection chambers with eccentric side walls turning the flow toward tail water and an outlet passage having a pier member extending in the direction of the flow lines.

8. In a hydraulic turbine the combination with a runner having a substantially axial discharge, of a draft tube therefor comprising an outer wall formed as a surface of revolution flaring outwardly away from the axis, a central conical core member having its surface similarly flared, said core and walls forming between them an annular passage radially flaring from a central axis in lines adapted to maintain the flow in annular hollow column formation while changing its direction and decelerating its velocity, and a chamber surrounding the outlet of said annular passage and comprising two collection chambers with eccentric side walls turning the flow toward tail water and a series of stay vanes at the outlet of said annular passage.

9. In a hydraulic turbine the combination with a runner having a substantially axial discharge, of a drift tube therefor comprising an outer wall formed as a surface of revolution flaring outwardly away from the axis, a central conical core member having its surface similarly flared, said core and walls forming between them an annular passage radially flaring from a central axis in lines adapted to maintain the flow in annular hollow column formation while changing its direction and decelerating its velocity, and a chamber surrounding the outlet of said annular passage and comprising two collection chambers with eccentric side walls turning the flow toward tail water, and a series of stay vanes at the outlet of said annular passage, the stay vanes on one side of the conduit having a different sectional curvature from the stay vanes on the other side of the conduit.

10. In a hydraulic turbine the combination with a runner having a substantially axial discharge, of a draft tube therefor comprising an outer wall formed as a surface of revolution flaring outwardly away from the axis, a central conical core member having its surface similarly flared, said core and walls forming between them an annular passage radially flaring from a central axis in lines adapted to maintain the flow in annular hollow column formation while changing its direction and decelerating its velocity, and a chamber surrounding the outlet of said annular passage and comprising two collection chambers with eccentric side walls turning the flow toward tail water and a series of stay vanes at the outlet of said annular passages, the stay vanes being generally convex toward tail water on one side of the conduit and generally concave toward tail water on the other side of the conduit.

11. In a hydraulic turbine the combination with a runner having a substantially axial discharge, of a draft tube therefor having an axially directed entrance portion and substantially radially directed discharge portion forming an elbow between them with a gradually curving surface of relatively large radius of curvature at the inner bend of the elbow, and radially flaring side surfaces at the discharge end of said entrance portion so that said entrance portion flares outward to the point of discharge into the discharge portion of the draft tube, the surface of the entrance portion being extended substantially axially to form the end surface of the discharge portion at the outer bend of the elbow.

12. In a hydraulic turbine the combination with a runner having a substantially axial discharge, of a draft tube therefor having an axially directed entrance portion and substantially radially directed discharge portion forming an elbow between them with a gradually curving surface of relatively large radius of curvature at the inner bend of the elbow and radially flaring side surfaces at the discharge end of said entrance portion so that said entrance portion flares outward to the point of discharge into the discharge portion of the draft tube, the outer bend of said elbow being formed along lines of relatively sharp curvature and connecting with an outwardly inclined surface of said entrance portion of the draft conduit.

13. A draft conduit for a hydraulic turbine comprising an axial flow entrance portion generally circular in section increasing in cross section in the direction of flow to its discharge end, and a collector passage for substantially radially directed discharge portion receiving the flow from said entrance portion and forming therewith an elbow shaped conduit with the bend of the elbow formed at the outwardly flaring surface of said entrance portion so that the flow is spread radially outward at the bend from axial to radial, said discharge portion receiving the fluid from said entrance portion upon a surface constituting the floor of said collector passage.

14. A draft conduit for a hydraulic turbine comprising an axial flow entrance portion generally circular in section increasing in cross section in the direction of flow to its discharge end, and a substantially radially directed discharge portion receiving the flow from said entrance portion and forming therewith an elbow shaped conduit with the bend of the elbow formed at the outwardly flaring surfaces of said entrance portion so that the flow is spread radially outward at the bend from axial to radial, and a central conical core in the elbow portion of said conduit spreading the flow outward into the discharge portion of said conduit and extending up into said axial portion.

15. In a hydraulic turbine the combination with a runner having a substantially axial discharge, of a draft tube therefor having an axially directed entrance portion and substantially radially directed discharge portion forming an elbow between them with a gradually curving surface of relatively large radius of curvature at the inner bend of the elbow and radially flaring side surfaces at the discharge end of said entrance portion so that said entrance portion flares outward to the point of discharge into the discharge portion of the draft tube, the outer bend of said elbow being formed along lines of relatively sharp curvature and connecting with an outwardly inclined surface of said entrance portion of the draft conduit, and a series of stay vanes extending across the conduit at the discharge end of said entrance portion.

16. In a turbine the combination with a runner, of a draft conduit having a portion of comparatively short length flaring toward a radial direction at is outlet end, a stationary means extending into said flared portion from the direction of its flared outlet end and disposed centrally therein and terminating close to the center of the discharge end of the runner to maintain a hollow column of water from the runner to the outlet of said flared portion, and a discharge passage receiving the flow from said flared portion and conducting a part of said flow on each side of the flared portion of the conduit and turning both parts of the flow into the downstream direction.

17. In a turbine the combination with a runner, of a draft tube having a portion of comparatively short length flaring toward a radial direction at its outlet end, a discharge passage receiving the flow from said flared portion and conducting a part of said flow on each side of the flared portion and turning both parts of the flow into the downstream direction, and a fixed central means extending into the outlet end of the flared portion of the conduit and terminating close to the discharge end of the runner to form an annular passage maintaining the flow in hollow column formation from the discharge end of the runner through the outlet extremity of the flared portion of the conduit.

18. In a turbine the combination with a runner, of a draft tube having a portion of comparatively short length flaring toward a radial direction at its outlet end, a discharge passage receiving the flow from said flared portion and conducting a part of said flow on each side of the flared portion and turning both parts of the flow into the downstream direction, and a fixed central means extending into the outlet end of the flared portion of the conduit to form an annular passage maintaining the flow in hollow column formation through the outlet extremity of the flared portion of the conduit.

19. A draft conduit for a hydraulic turbine comprising an axial flow entrance portion generally circular in section increasing in cross section in the direction of flow to its discharge end, and a collector having a substantially radially directed discharge portion having a bottom surface upon which the flow from said entrance portion impinges, said radial and entrance portions forming an elbow shaped conduit with the bend of the elbow formed at the outwardly flaring surface of said entrance portion so that the flow is spread radially outward at the bend from axial to radial, said radial flow portion having a roof surface formed as a continuation of said flaring surface of said entrance portion.

20. A draft tube for turbines having inlet and outlet portions with a bend or elbow between them, the upstream wall of the outlet portion extending down to the surface on which the stream impinges at the bend tangent to the stream.

21. A draft tube for water turbines having a tapered inlet portion and an outlet portion at an angle thereto, the upstream wall of the outlet portion extending tangent to the stream in a straight line to the surface of the outlet section impinged by the stream passing through the tapered inlet portion.

22. A draft tube for water turbines having a tapered inlet portion with a bell mouth at its end, and an outlet portion at an angle thereto having a tangent upstream wall intersecting the bell mouth surface.

23. A draft tube for water turbines having a delivery section with an inlet formed by a flared top wall portion the forward part of which is continued forwardly to form a longitudinal roof extension and a central vertical pier member supporting said extension from the floor of said section.

24. A draft tube for water turbines having a delivery section with an inlet formed by a flared top wall portion the forward part of which is continued forwardly to form a longitudinal roof extension tapered toward the roof as the free end of the section is approached and a central vertical pier member supporting said extension from the floor of said section.

25. A draft conduit for a hydraulic turbine comprising an axial flow entrance portion generally circular in section and increasing in cross-section in the direction of flow to its discharge end, and a collector passage having a substantially radially directed discharge portion receiving the flow from said entrance portion upon a lower surface, said radial and entrance portions forming an elbow shaped conduit with the bend of the elbow formed at the outward flaring edge of said entrance portion so that the flow is spread radially outward at the bend from axial to radial, said radial flow portion having a roof surface formed as a continuation of said flaring surface of said entrance portion and said lower surface constituting the floor of said collector passage.

26. A draft tube for turbines having inlet and outlet portions with a bend or elbow between them, the up-stream wall of the outlet portion extending down to the surface on which the stream impinges at the bend tangent to the stream, and a cone cooperating with said inlet portion and extending upwardly from said surface.

27. A draft tube for turbines having inlet and outlet portions with a bend or elbow between them, the upstream wall of the outlet portion extending down to the surface on which the stream impinges at the bend tangent to the stream, and a cone supported by said surface and cooperating with said inlet portion, the lower end of said upstream bell being adjacent to the base of said cone.

28. A draft tube for water turbines having a tapered inlet portion with a bell mouth at its end, an outlet portion at an angle thereto having a tangent upstream wall intersecting the bell mouth surface, and a cone disposed substantially centrally with respect to said bell mouth to provide an annular passage.

29. A draft tube for water turbines having a tapered inlet portion with a bell mouth at its end, an outlet portion at an angle thereto having a tangent upstream wall intersecting the bell mouth surface, and a cone disposed substantially centrally with respect to said bell mouth to provide an annular passage, the height of said cone being materially greater than its mean diameter.

30. A draft tube for water turbines having a tapered inlet portion with a bell mouth at its end, and an outlet portion at an angle thereto having a tangent upstream wall intersecting the bell mouth surface, said outlet portion having a spiral collector passage starting from said tangent upstream wall.

HARVEY BIRCHARD TAYLOR.